W. HAISTINGS, Sr.
Three-Horse Equalizers.

No. 140,268. Patented June 24, 1873.

UNITED STATES PATENT OFFICE.

WILLIAM HAISTINGS, SR., OF FOWLER, ILLINOIS.

IMPROVEMENT IN THREE-HORSE EQUALIZERS.

Specification forming part of Letters Patent No. 140,268, dated June 24, 1873; application filed April 10, 1873.

*To all whom it may concern:*

Be it known that I, WILLIAM HAISTINGS, Sr., of Adams county, Illinois, have invented certain new and useful Improvements in Attachments for Three-Horse Equalizers, of which the following is a description, reference being had to the accompanying drawings:

The invention relates to a means of attaching a three-horse equalizer to a vehicle, and consists in providing the rear of a tongue with a cross-bar and triangular brace, arranged so as to be supported at its rear upon the hounds; the whole device being intended to remove the draft a proper distance from the tongue, and at the same time to properly sustain the draft-bar.

Figure 1:
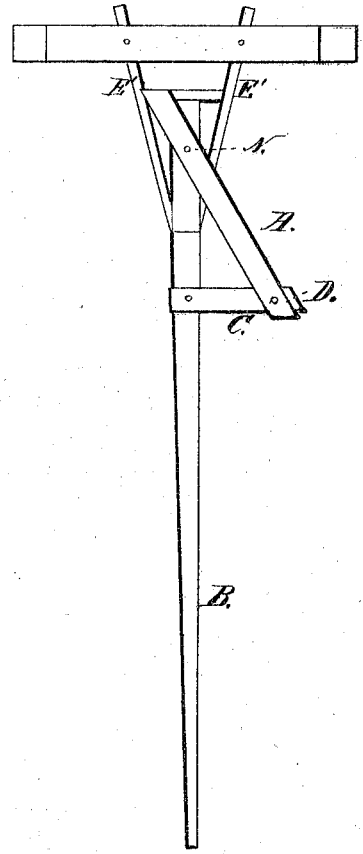
Figure 2:
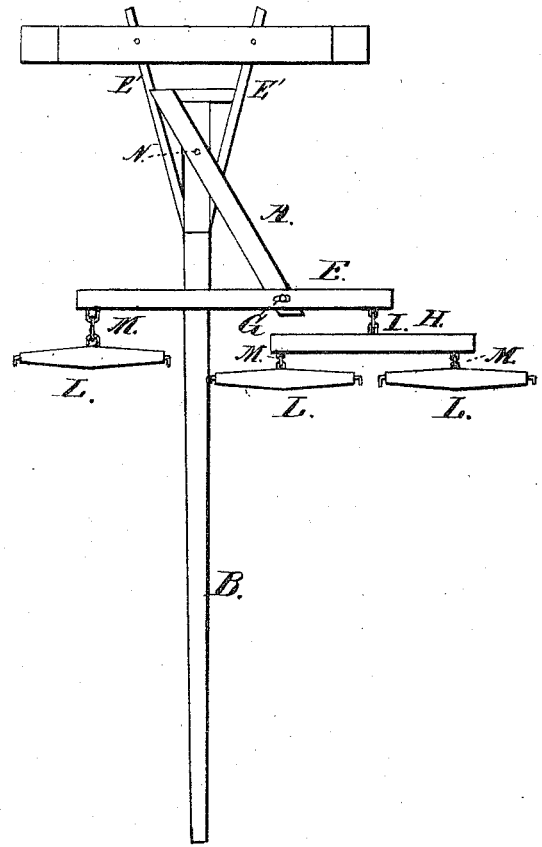

Figure 1, is a plan view of a device embodying the elements of the invention. Fig. 2 is a view of same with the equalizing-bar attached.

A in the accompanying drawings is a bar of suitable material extending at an acute angle forward from the base of and to one side of the tongue B, its rear being secured to the base of the tongue and the hounds E, thus enabling it to resist pressure in any direction. The front end of the bar A is firmly secured to one end of the cross-bar C, which is secured to the tongue at a point directly opposite the end of the bar A. The equalizing-bar E is attached at the junction of the bars A and C, by the pin or hammer G, at a point one-third of its length from one, and two-thirds of its length from the other end, and supported by the bar A while resting upon the bar C. The single-tree L is attached in any suitable manner to the end of the longer, and the double-tree I to the end of the shorter, arm of the equalizing-bar E; thus the leverage of the longer arm being double that of the shorter, the horses draw evenly.

I am aware that various devices, such as blocks have been employed for attaching an equalizer to a tongue; but I do not claim any similar device in this application; but What I do claim as my invention, and desire to secure by Letters Patent, is—

The diagonal sustaining-bar A, in combination with the transverse bar C, for the purpose of attaching and sustaining the equalizing-bar E, substantially as shown and described.

WILLIAM HAISTINGS, SR.

Witnesses:
WILLIAM MCCLELLAND,
GEO. H. THOMPSON.